United States Patent
Swaminathan et al.

(10) Patent No.: US 11,687,334 B2
(45) Date of Patent: Jun. 27, 2023

(54) DECENTRALIZED MANAGEMENT OF SOFTWARE CONFIGURATIONS

(71) Applicant: International Business Machines Corporation, Armonk, NY (US)

(72) Inventors: Saishruthi Swaminathan, Sunnyvale, CA (US); Tommy Chaoping Li, San Francisco, CA (US); Cindy Han Lu, San Jose, CA (US); Animesh Singh, Santa Clara, CA (US); Srinivas R. Brahmaroutu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 17/382,453

(22) Filed: Jul. 22, 2021

(65) Prior Publication Data
US 2023/0021825 A1   Jan. 26, 2023

(51) Int. Cl.
G06F 8/71 (2018.01)
H04L 12/42 (2006.01)
H04L 67/104 (2022.01)

(52) U.S. Cl.
CPC .............. *G06F 8/71* (2013.01); *H04L 12/42* (2013.01); *H04L 67/104* (2013.01)

(58) Field of Classification Search
CPC .......... G06F 8/71; H04L 12/42; H04L 67/104
USPC ........................................................ 717/121
See application file for complete search history.

(56) References Cited

U.S. PATENT DOCUMENTS

| | | | |
|---|---|---|---|
| 6,044,217 A | 3/2000 | Brealey et al. | |
| 9,712,577 B2 | 7/2017 | Shaw et al. | |
| 9,983,898 B2 | 5/2018 | Anderson et al. | |
| 10,397,370 B2 * | 8/2019 | Tak | H04L 67/34 |
| 2002/0019971 A1 | 2/2002 | Zygmont et al. | |
| 2004/0261071 A1 | 12/2004 | Chuang et al. | |
| 2013/0054826 A1 | 2/2013 | Hong et al. | |
| 2015/0268944 A1 | 9/2015 | Chinnappan et al. | |

FOREIGN PATENT DOCUMENTS

| | | |
|---|---|---|
| CN | 107908434 A | 4/2018 |
| CN | 108491148 A | 9/2018 |
| CN | 111309205 A | 6/2020 |
| CN | 111581198 A | 8/2020 |
| CN | 112148272 A | 12/2020 |

\* cited by examiner

*Primary Examiner* — John Q Chavis
(74) *Attorney, Agent, or Firm* — Matthew Zehrer

(57) ABSTRACT

A peer-to-peer decentralized software configuration manager is described. The peer-to-peer system provides a crowdsourced mechanism to determine and recommend the efficient software configurations. A computer system may subscribe to a ring or group of network connected computers. Once subscribed, the computer system receives a ring data structure that may include one or more software configuration entries. The ring data structure is accessible to each subscribed computer system to the currently installed software configurations and document the relative success or failure of those configurations. The ring data structure may be utilized to identify a more efficient or user friendly software configuration that is currently installed and utilized by a subscribed computer system.

20 Claims, 10 Drawing Sheets

200

| Ring ID | Node ID | PU ID | Config ID | App ID | User Setting(s) | User Specified Success/Fail | Recommendation Score |
|---|---|---|---|---|---|---|---|
| Backend | Node 12 | CPU | A | App 120 | A, B, C | Success | 60 |
| Backend | Node 12 | CPU | A | App 122 | M, N, O | Success | 60 |
| Backend | Node 12 | CPU | A | App 124 | X, Y, Z | Success | 90 |
| Backend | Node 14 | CPU | A | App 120 | A, B, D | Success | 75 |
| Backend | Node 14 | CPU | A | App 122 | M, N, P | Success | 75 |
| Backend | Node 14 | CPU | A | App 124 | X, Y, Z | Success | 90 |
| Backend | Node 16 | CPU | A | App 120 | A, B, D | Success | 75 |
| Backend | Node 16 | CPU | A | App 122 | M, N, P | Success | 75 |
| Backend | Node 16 | CPU | A | App 124 | X, Y, Z | Success | 90 |

| Ring ID | Node ID | App ID | Plug-in ID | User Setting(s) | User Specified Success/Fail | Recommendation Score |
|---|---|---|---|---|---|---|
| Backend | Node 12 | App 120 | Plug 202 | A, B, C | Fail | 15 |
| Backend | Node 12 | App 120 | Plug 202 | A, C, D | Success | 75 |
| Backend | Node 14 | App 120 | Plug 202 | A, C, E | Success | 90 |
| Backend | Node 16 | App 120 | Plug 202 | A, C, E | Success | 90 |

*FIG. 5*

| Ring ID | Node ID | Config ID | Install Time | App ID | Plug-in ID | User Setting(s) | User Specified Success/Fail | Recommendation Score |
|---|---|---|---|---|---|---|---|---|
| Backend | Node 12 | A | 1/1/2021; 10:03 PM | App 120 | Plug-in 204 | A, B, C | Success | 60 |
| Backend | Node 12 | A | 1/3/2021; 8:32 AM | App 122 | Plug-in 206 | M, N, O | Fail | 40 |
| Backend | Node 12 | A | 1/3/2021; 8:45 AM | App 124 | Plug-in 208 | X, Y, Z | Success | 90 |
| Backend | Node 12 | A | 2/16/2021; 10-30 AM | App 122 | Plug-in 210 | M, N, Q | Success | 75 |

US 11,687,334 B2

DECENTRALIZED MANAGEMENT OF SOFTWARE CONFIGURATIONS

BACKGROUND

Various embodiments of the present application generally relate managing software configuration(s). More specifically, various embodiments of the present application relate to managing software configurations within a peer-to-peer decentralized environment.

SUMMARY

In an embodiment of the present invention, a peer to peer computer system network is presented. The system includes a first computer and a second computer connected to the first computer by a network. The first computer includes a first central processing unit (CPU) and a first memory communicatively connected to the first CPU. The first memory includes first program instructions, when executed by the first CPU, cause the first computer to subscribe to a ring of a plurality of peer computer systems by storing a ring data structure within the first memory that is received from the second computer. The first program instructions, when executed by the first CPU, further cause the first computer to the first computer to obtain read and write access to the ring data structure in response to the first computer subscribing to the ring of a plurality of peer computer systems. The first program instructions, that when executed by the first CPU further cause the first computer to write a first application configuration entry to the ring data structure (updated ring data structure). The first application configuration entry includes a first node identifier that identifies the first computer, an application identifier that identifies a first instance of an application stored in the first memory, one or more first user specified settings (first user-settings) of the first instance of the application, and a first recommendation score that indicates a first computer user specified level of success of a combination of the first instance of the application and the first user-settings. The second computer includes a second CPU and a second memory communicatively connected to the second CPU. The second memory includes second program instructions, when executed by, the second CPU cause the second computer to obtain and read the updated ring data structure from the first computer and cause the second computer to store a second instance of the application within the second memory and set second user-settings of the second instance of the application the same as the first user settings, if the recommendation score of the first application configuration entry exceeds a predetermined threshold.

In another embodiment, a peer to peer computer system network is presented. The system includes a first computer connected to a plurality of computers by a network. The first computer includes a central processing unit (CPU) and a memory communicatively connected to the CPU. The memory includes program instructions, when executed by, the CPU cause the first computer to take an inventory of one or more applications stored in the first memory (first computer applications) and cause the first computer to request and receive a read-only copy of a plurality of ring data structures associated with each subscribed ring from one or more of the plurality of computers. The program instructions, when executed by the CPU, further cause the first computer to compare the first computer applications against one or more application identifiers within the received plurality of read-only copies of the ring data structures. Each of the one or more application identifiers identify an application stored in a respective local memory of the plurality of computers (ring identified applications). The program instructions, when executed by the CPU, further cause the first computer to present a prompt upon a user-interface, the prompt comprising a recommended ring associated with a recommended read-only ring data structure that contains a highest number of mutually inclusive applications of the compared first computer applications and the ring identified applications. The program instructions, when executed by the CPU, further cause the first computer to receive a user selection of the recommended ring via the user-interface and cause the first computer to subscribe to the recommended ring (subscribed ring). The subscribed ring includes the first computer and a sub-set of the plurality of computers connected by the network. In subscribing to the subscribed ring, the first computer and the sub-set of the plurality of computers are granted both read and write access to a subscribed ring data structure associated with the subscribed ring.

In another embodiment, a peer to peer computer system network method is presented. The method includes taking, with a first computer, an inventory of one or more applications stored in a first memory of the first computer (first computer applications). The method further includes receiving, with the first computer, a read-only copy of a plurality of ring data structures associated with each subscribed ring of a peer computer that is connected to the first computer by a network. The method further includes comparing, with the first computer, first computer applications against one or more application identifiers within the read-only copies associated with the plurality of ring data structures, wherein each of the one or more application identifiers identify an application stored in a local memory of the peer computer (ring identified applications). The method further includes presenting, with the first computer, a prompt upon a user-interface of the first computer, the prompt comprising a recommended ring associated with a recommended read-only ring data structure that contains a highest number of mutually inclusive applications of the compared first computer applications and the ring identified applications. The method further includes receiving, with the first computer, a user selection of the recommended ring via the user-interface. The method further includes subscribing, with the first computer, to the recommended ring (subscribed ring), the subscribed ring comprising the first computer and the peer computer, wherein in subscribing to the subscribed ring, the first computer and the peer computer are granted both read and write access to a subscribed ring data structure associated with the subscribed ring.

These and other embodiments, features, aspects, and advantages will become better understood with reference to the following description, appended claims, and accompanying drawings.

BRIEF DESCRIPTION OF THE DRAWINGS

FIG. 4 is a block diagram illustrating an exemplary software configuration management ring data structure in accordance with one or more embodiments.

FIG. 5 is a block diagram illustrating an exemplary software configuration management ring data structure in accordance with one or more embodiments.

Figure 1:
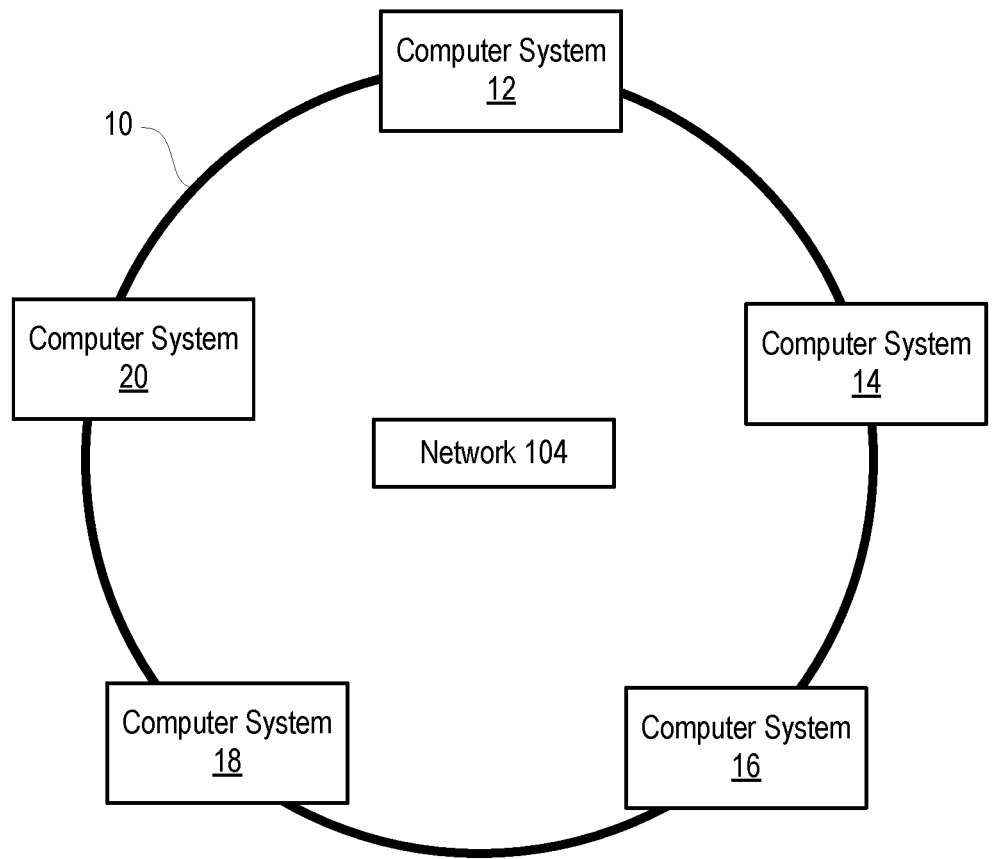
FIG. 1 is a block diagram illustrating a peer-to-peer decentralized software configuration management ring made up of network connected subscribed computer systems in accordance with one or more embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

It is often troublesome to determine what is the best configuration of software on one's electronic device. When a new device is initialized or when one's software needs change, one typically needs to manually configure or set up their configuration. Often times a team or group may suggest guidelines for the software configurations of the members. Typically, granular details of application or plugin versioning and specific user settings are omitted from these guidelines and need to be determined or set by members trial and error. Once a working or beneficial configuration has been determined by a member, the configuration is rarely documented in the group's guidelines. Such practices render inconsistent and inefficient software configurations perpetuated across the members electronic devices.

Therefore, according to embodiments, a peer-to-peer decentralized software configuration manager is described. The peer-to-peer system provides a crowdsourced mechanism to determine and recommend the efficient software configurations. A computer system may subscribe to a ring or group of network connected computers. Once subscribed, the computer system receives a ring data structure that includes software configuration entries. The ring data structure is accessible to each subscribed computer system to document the relative success or failure of locally installed and utilized software configurations and may be utilized to identify a more efficient or user friendly software configuration that is currently installed and utilized by a subscribed computer system.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, circuits, or the like, have not been described in exhaustive detail so as not to unnecessarily obscure more pertinent aspects of the embodiments described herein.

FIG. 1 is a block diagram illustrating a peer-to-peer decentralized software configuration management ring 10 made up of network 104 connected subscribed peer computer systems 12, 14, 16, 18, and 20, which may be referred to herein as nodes, in accordance with one or more embodiments. A peer-to-peer decentralized software configuration management ring, which may be referred to herein as a ring, is a group of two or more network connected nodes that store or access the same ring data structure associated with the common ring. In the peer-to-peer network 104, the group of computers are linked together with equal permissions and responsibilities for processing data. Unlike traditional client-server networking, no devices in a peer-to-peer network 104 are designated solely to serve or to receive data. Once subscribed, peer computer systems 12, 14, 16, 18, and 20 are equally privileged, equipotent participants in the one or more functions and/or responsibilities of the configuration management embodiments herein described. Peer computer systems 12, 14, 16, 18, and 20 make a portion of their resources, such as processing power, disk storage or network bandwidth, directly available to other network participants, without the need for central coordination by a higher level manager, such as a server.

The network 104 may be any suitable network or combination of networks and may support any appropriate protocol suitable for communication of data and/or code from one ring node to one or more other ring nodes. The network 104 may support wireless communications between ring nodes and/or may support hard-wired communications between ring nodes. In an embodiment, the network 104 may be the Internet and may support IP (Internet Protocol). In another embodiment, the network 104 is implemented as a local area network (LAN) or a wide area network (WAN). In another embodiment, the network 104 is implemented as any appropriate cellular data network, cell-based radio network, or the like. In another embodiment, the network 104 is implemented as any suitable network or combination of networks. Although one network 104 is shown, in other embodiments any number of networks (of the same or different types) may be present to communicatively connect the ring nodes.

Figure 2:
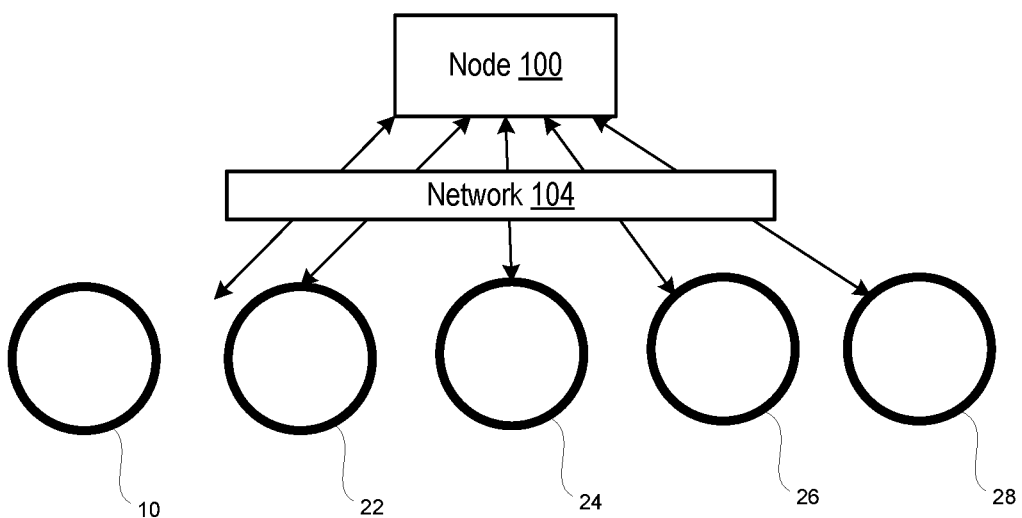
FIG. 2 is a block diagram illustrating a computer system node subscribed to a plurality of software configuration management rings in accordance with one or more embodiments.

FIG. 2 is a block diagram illustrating a computer system node 100 subscribed to two or more rings 10, 22, 24, 26, etc., in accordance with one or more embodiments. For clarity, node 100 may be computer system 12, 14, 16, 18, or 20, exemplarily depicted in FIG. 1. In embodiments, a ring may be created or may exist for one particular software application development domain or environment. For example, node 100 may create ring 10 as a back end developers ring, may create ring 22 as a front end developers ring, may create ring 24 as a database developers ring, may create ring 26 as a Mac® user group, may create a ring 28 for a predefined software developers kit (SDK), or the like. A software application development domain or environment is any such domain or environment in which nodes 100 associated therewith share or ought to share the same software tools, applications, or the like. As such, each node 100 that subscribes to ring 10 share or ought to share the same first set of software tools, applications, or the like; each node 100 that subscribes to ring 22 share or ought to share the same second set of software tools, applications, or the like; etc. In an embodiment, the first set and the second set of software tools, applications, etc. are mutually exclusive (i.e., no shared software tools, applications). In an alternative embodiment, the first set and the second set of software tools, applications, etc. are non-mutually exclusive (i.e., one or more shared software tools, applications).

Figure 3:
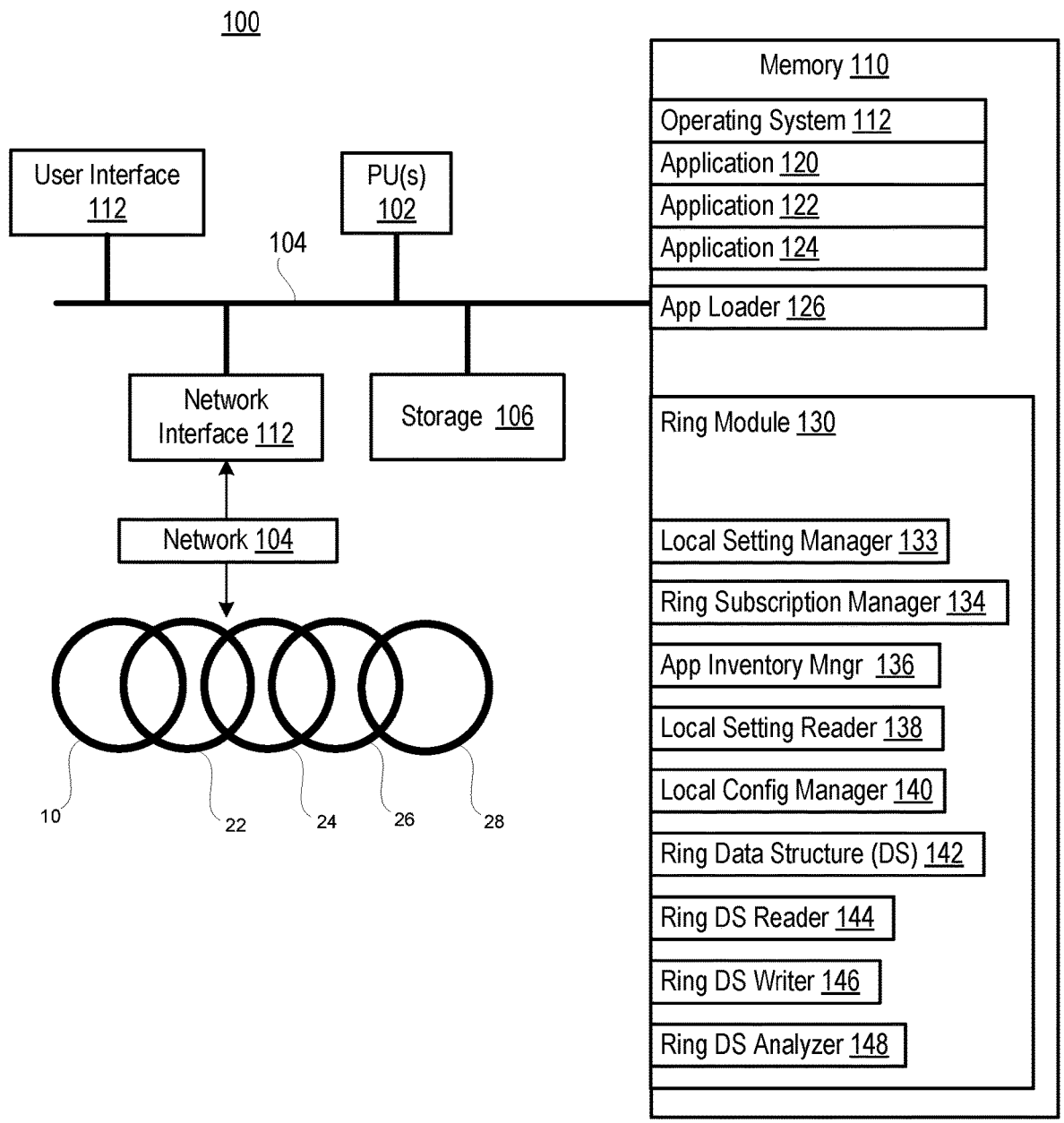
FIG. 3 is a block diagram illustrating a computer system node and an implementation of a software configuration management ring module in accordance with one or more embodiments.

FIG. 3 is a block diagram illustrating node 100 and an implementation of a software configuration management ring module 130, in accordance with one or more embodiments. Node 100 may include one or more processing units 102 for executing applications, code, modules, programs and/or instructions stored in memory 110 to perform functions or work associated therewith; network interface 112, memory 110; and one or more communication buses 104 for interconnecting these components. One or more communication buses 104, optionally, include circuitry (sometimes called a chipset) that interconnects and controls communications between components that are connected by bus 104.

PU(s) 102 may be one or more central processing units (CPUs), graphical processing units (GPUs), processors, integrated processing circuits (ICs), microprocessors, or the like. Generally, PU(s) 102 are processing elements that are able to evoke program instructions stored upon memory 110 to cause the node 100 or components therein to perform function(s) denoted by the program instructions.

PU(s) 102 and memory 110 may also be coupled to storage 106 by buses 104. In an embodiment, storage 106 are disk drive storage device(s), solid state storage device(s), or the like. In embodiments the multiple devices are configured to appear as a single large storage device. The contents of the system memory 110, or any portion thereof, may be stored to and retrieved from the storage 106, as needed. The storage 106 generally has a slower access time than does the memory 110, meaning that the time needed to read and/or write data from/to the memory 110 is less than the time needed to read and/or write data from/to for the storage 106.

PU(s) 102 and memory 110 may also be coupled to user interface 112 by buses 104. The user interface 112 utilizes a screen, touch screen, speaker, microphone, and/or haptic device to provide user output data and to receive user input data. For example, one interface may be displayed in a graphical user interface (GUI) that is presented upon a touch screen and another voice user interface (VUI) may be presented for output upon speaker. The user interface(s) 112 may be a user interface that provides content, information, data, etc. to the user visually, audibly, and/or via feeling via a haptic device.

Network interface 112 may contain electronic components and logic to adapt or convert data of one protocol on I/O bus 104 to another protocol of network 104. As such, network interface 112 may communicatively connect other nodes to node 100 by way of network 104. Network interface 112 may be a network adapter, PCI adapter, PCIe adapter, NVLink adapter, or the like.

Memory 110 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 110, or alternatively the non-volatile memory device(s) within memory 110, comprises a computer readable storage medium. In some embodiments, memory 110, or the computer readable storage medium of memory 110, stores the following applications, programs, modules, instructions, data structures, or a subset or superset thereof:

an operating system 112 for managing node 100 hardware resources, for establishing and providing one or more user interface(s) 112, for running the applications 120, 124, 126, etc., stored in memory 110;

software applications 120, 122, 124;

an application loader 126 for loading an application from another computer system via network 104 and storing the application in memory 110;

a ring module 130 for managing one or more rings, including:
  a) a local setting manager 133 for establishing user settings rule set(s) for applications stored in memory 110;
  b) a ring subscription manager 134 for subscribing to one or more rings;
  c) an application inventor manager 136 for taking an inventory of the software applications stored in memory 110;
  d) local user setting reader 138 for determining user indicated settings of the software applications stored in memory 110;
  e) local configuration manager 140 for determining a software application configuration(s), sub-configurations, for determining a recommendation score for the software application configuration(s), sub-configuration(s);
  f) a ring data structure (DS) 142 stored in memory 110 associated with each subscribed ring;
  g) a ring DS reader 144 for obtaining a ring DS from one or more other nodes of the applicable shared subscribed ring and for reading updates or changes to the DS made by another node subscribed to the applicable shared subscribed ring;
  h) a ring DS writer 146 for writing to the ring DS of an subscribed ring; and/or
  i) a ring DS analyzer 148 for performing data analytics upon a ring DS.

Each of the above identified elements may be stored in one or more of the previously mentioned memory devices and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 110 may store a subset of the modules and data structures identified above. Furthermore, memory 110 may store additional modules and data structures not described above. In some embodiments, the programs, modules, and data structures stored in memory 110, or the computer readable storage medium of memory 110, provide instructions for implementing any of the methods described below with reference to FIG. 6A, FIG. 6B, FIG. 8, FIG. 9A, FIG. 9B, FIG. 10, FIG. 11, FIG. 12. In some embodiments, some or all of these modules may be implemented with specialized hardware circuits, such as a field programmable gate array (FPGA), or the like, that subsume part or all of the module function.

Local setting manager (LSM) 133 may establish user settings rule set(s) for applications stored in memory 110. For example, LSM 133 may receive user indication(s) as to which user-settings are static. LSM 133 may set one or more user setting(s) within a previously installed application to be the same as or consistent with recommended user settings associated with recommended configuration or sub-configuration. Similarly, LSM 133 may set one or more user setting(s) within a newly installed application to be the same as or consistent with recommended user settings associated with recommended configuration or sub-configuration. Once static user settings are established by LSM 133, the LSM 133 may compare recommended user-setting(s) against those user setting(s) that have been deemed static to determine if the recommended user-settings should be integrated into the installed application. LSM 133 may also detect one or more patterns or tendencies of the user's preferred user-settings(s). Once user-setting patterns or tendencies have been established by LSM 133, the LSM 133 may then determine whether recommended user-setting(s) are inconsistent with the predetermined user-setting patterns or tendencies.

Ring subscription manager (RSM) 134 may subscribe to one or more rings. RSM 134 may keep a current account of the rings to which the node is subscribed. RSM 134 may broadcast a query to peer nodes 100 connected to the same network 104 ask those nodes which rings they are subscribed. RSM 134 may receive a query result from such nodes. RSM 134 may subscribe to one or more rings denoted in the query result. RSM 134 may be grated or otherwise receive read/write access to a ring DS 142 associated with the subscribed ring. RSM 134 may request and receive from peer nodes 100 a read-only copy of the ring DS(s) 142 associated with the peer nodes' subscribed rings. RSM 134 may compare these DS(s) and the installed applications to find the DS(s) that include the highest number of mutually inclusive applications. RSM 134 may subscribe to those ring DS(s) with the highest number of mutually inclusive applications, thereby receiving read/write access to those ring DS(s).

Application inventor manager 136 may take an inventory of the software applications stored in memory 110. Application inventory manager 136 may query operating system 112, and receive therefrom, the currently installed applications (e.g., application 120, 122, and/or 124) stored in memory 110 of the associated node 100.

Local user setting reader 138 may determine user settings of the software applications stored in memory 110. Local user setting reader 138 may determine the user settings of applications in memory 110 by scanning such applications and pulling those specified user settings therefrom. These user settings may be written into an associated ring DS 142 by ring DS writer 146.

Local configuration manager (LCM) 140 may determine software application configuration(s), sub-configurations, and determine a recommendation score thereto. LCM 140 may identify the new sub-configuration installed local to the applicable node and the replaced down level sub-configuration. LCM 140 may recommend a more efficient or more user-friendly application configuration or configuration if an associated configuration entry has a higher recommendation score relative to the entry of the currently installed or utilized application configuration or sub configuration.

A ring data structure (DS) 142 may be stored in memory 110 and is associated with a particular subscribed ring. The ring DS 142 is generally a data structure that contains metadata about one or more configurations or sub-configurations associated with nodes 100 thereto subscribed. For example, the ring DS 142 may contain a configuration entry that specifies the node associated with the configuration, the identity of one or more applications installed in the nodes local memory 100 associated with the configuration, identification(s) of hardware resources needed to evoke the configuration applications, the identity of added plug-ins of the configuration applications, identification(s) of user-setting(s) of the configuration applications, etc.

A full copy of the ring DS 142 may be stored locally in memory 110 of each node 100 that is subscribed to the associated ring. A portion of the ring DS 142 may be stored locally in memory 110 of each node 100 that is subscribed to the associated ring such that each portion stored by the nodes 100 effectively store the full copy of the ring DS 142. The ring DS 142 contains application configuration or sub-configuration entries associated with each application configuration or sub-configuration utilized by each node 100 that is subscribed to the associated ring. The application configuration or sub-configuration entry may include a node identifier, configuration identifier, sub-configuration identifier, install time, user-setting listing, whether the configuration or sub-confirmation has been a success or failure, and/or a recommendation score.

The ring DS reader 144 may obtain a ring DS from one or more other nodes of the applicable shared subscribed ring. The ring DS reader 144 may also read or obtain updates or changes to the DS 144 made by another node subscribed to the applicable shared subscribed ring. When there is a relatively low number of subscribed nodes, the ring DS reader 144 may be notified by applicable nodes that changes to the ring DS has been made whereby, in turn, the ring DS reader 144 may obtain an updated or current version of the ring DS from such node(s). When there is a relatively large number of subscribed nodes, ring DS reader 144 may implement a ring DS 142 reconciliation process to obtain the active versions of the ring DS 142 from each node and reconcile these data structures to form a current ring DS 142.

Ring DS analyzer 148 may store the most current ring DS 142 into memory 110 and may send the most current ring DS 142 to the other subscribed nodes 100 over the network 104. Ring analyzer 148 may determine the last time the ring DS 142 was analyzed and determine whether there has been a new or changed a configuration or sub-configuration since the last analysis thereof.

FIG. 4 is a block diagram illustrating an exemplary ring data structure 200, in accordance with one or more embodiments. Ring data structure 200 includes entries of software application sub-configurations (e.g., depicted as rows) written by ring DS writer 146 of applicable nodes 12, 14, 16. Each sub-configuration entry includes a ring identifier 202, a node identifier 204, a processing unit type identifier 205 that identifies the processing unit used to evoke the specified configuration or sub-confirmation, a configuration identifier 206, and application identifier 208, user setting listing 210, sub-configuration success/fail identifier 212, and a sub-configuration recommendation or success/fail score 214. A ring identifier 202 may identify the domain or environment of the associated ring.

In the depicted exemplary ring data structure 200, the sub-configuration success/fail score 214 is based upon the number of instance of nodes in the same subscribed ring that utilize the same sub-configuration. A configuration is generally the combination of applications utilized by a node of a subscribed ring. Therefore, in the depicted data structure configuration A consisting of application 120, 122, and 124 is utilized by each node 12, 14, and 16 of the backend developer's ring. A sub-configuration is defined herein as the combination of an application, the applicable plug-in(s) of that application, and the applicable user-settings of that application.

As depicted, three nodes 12, 14, and 16 each have loaded and utilize the same sub-configuration: application 124 with user settings X, Y, Z running an a central processing unit (CPU). The relative larger number of the sub-configuration loaded and utilized by the nodes 12, 14, and 16 of the same ring dictates a relatively high recommendation score of 90. Similarly, two nodes 14, and 16 each have loaded and utilize the same sub-configurations: application 120 with user settings A, B, D running on a CPU & application 122 with user settings M, N, P running on a CPU. The relative smaller number of these sub-configurations loaded and utilized by the nodes of the same ring dictates a relatively smaller recommendation score of 75. Likewise, a lone node 12 has loaded and utilizes sub-configurations: application 120 with user settings A, B, C running on a CPU & application 122 with user settings M, N, O running on a CPU. The relative smaller number of these sub-configurations loaded and utilized by the nodes of the same ring dictates a relatively smaller yet recommendation score of 60.

FIG. 5 is a block diagram illustrating an exemplary ring data structure 220, in accordance with one or more embodiments. Ring data structure 220 includes entries of software application sub-configurations (e.g., depicted as rows) written by ring DS writer 146 of applicable nodes 12, 14, 16. Each sub-configuration entry includes a ring identifier 202, a node identifier 204, an application identifier 208, a plug-in identifier 216, user setting listing 210, sub-configuration success/fail identifier 212, and a sub-configuration success/fail score 214. In the depicted exemplary ring data structure 220, the sub-configuration success/fail score 214 is based upon the sub-configuration success/fail identifier 212 and the number of instance of nodes in the same subscribed ring that utilize the same sub-configuration.

In the depicted data structure 220, node 12 includes a sub-configuration consisting of application 120, plug-in 202, and user-settings A, B, C; node 12 further includes a sub-configuration consisting of application 120, plug-in 202, and user-settings A, B, D; and node 14 and node 16 both include a sub-configuration consisting of application 120, plug-in 202, and user-settings A, B, E.

As depicted, node 12 modified the user-settings associated with application 120 from user-settings A, B, C, to user-settings A, B, D. The node 12 indicated a failure of the sub-configuration associated with user-settings A, B, C. Node 14 and node 16 utilize the same sub-configuration: application 120, plug-in 202, and user-settings A, B, E. The relative larger number of the sub-configuration loaded and utilized by the nodes 14 and 16 of the same ring dictates a relatively high recommendation score of 90. Node 12 includes a failed sub-configuration consisting of application 120, plug-in 202, and user-settings A, B, C which dictates a relatively low recommendation score of 15. On the other hand, node 12 includes a successful sub-configuration consisting of application 120, plug-in 202, and user-settings A, B, D which dictates a relatively higher recommendation score of 75.

Figure 6A:
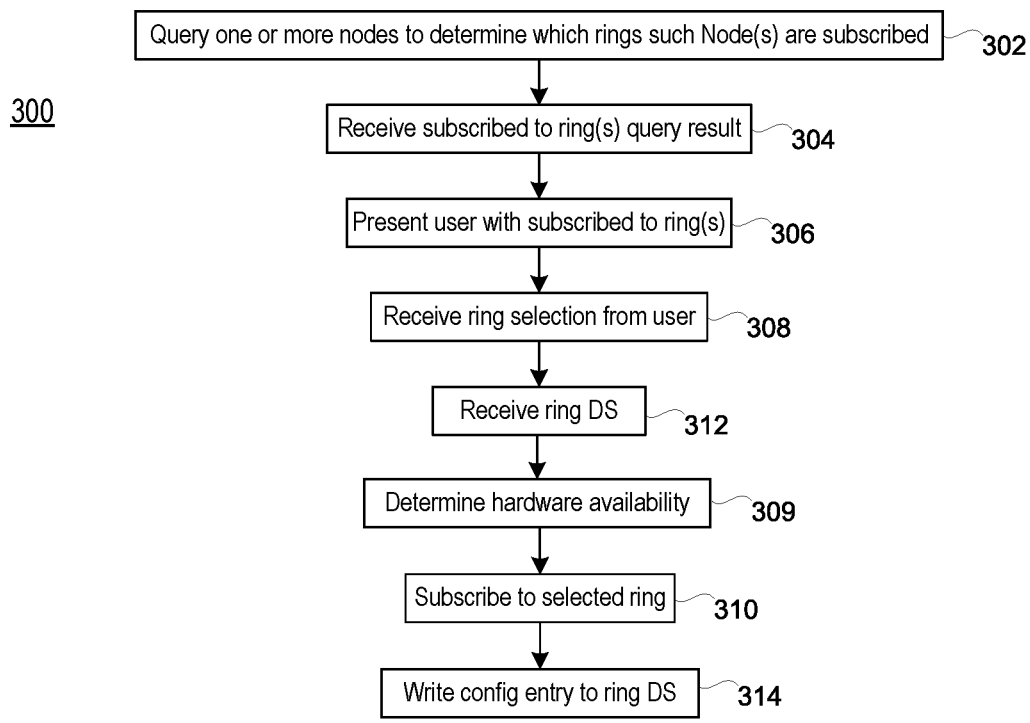
FIG. 6A is a block diagram illustrating a method of a computer system node subscribing to a software configuration management ring in accordance with one or more embodiments.

FIG. 6A is a block diagram illustrating a method 300 of a node 100 subscribing to a software configuration management ring, in accordance with one or more embodiments. Method 300 may be utilized by the node 100 PU(s) 102 evoking ring module 130 stored on memory 110 to cause the node 100 to carry out the described functions. Method 300 begins at block 302 by RSM 134 of a first node 100, herein referred to as node 100*a*, querying at least one other node, herein referred to as node 100*b*, so as to receive or otherwise determine the ring(s) that node 100*b* is subscribed. In a particular implementation, the RSM 134 of node 100*a* may broadcast the query to peer nodes 100 connected to the same network 104. For example, the RSM 134 of node 100*a* may broadcast the query to the peer nodes connected to the same LAN. In another particular implementation, the RSM 134 of node 100*a* may broadcast the query to a predetermined set or group of peer nodes. For example, the RSM 134 of node 100*a* may broadcast the query to one or more previously trusted peer nodes via network 104.

Method 300 may continue with RSM 134 of node 100*a* receiving a query result from node 100*b* of the rings to which node 100*b* is subscribed via network 104 (block 304). In a particular implementation, the node 100*b* evokes its RSM 134, that keeps a current account of the rings that node 100*b* is subscribed, to determine the applicable rings. In a particular example, node 100*b* has previously subscribed to only rings 10, 22. In response to the block 302 query from node 100*a*, node 100*b* resulting sends a query result back to node 100*a* that denotes rings 10 and 22 as the exclusive set of rings that which node 100*b* is subscribed.

Method 300 may continue with node 100*a* presenting the query result (block 306). For example, the operating system 112 of node 100*a* presents an identifier of the rings associated with the query result upon the user interface(s) 112 to the user of node 100*a*. Node 100*a* may also query the user of node 100*a* to select one or more of the rings associated with the query result. For example, the operating system 112 of node 100*a* prompts the user to select one or more of the rings associated with the query result (e.g., rings 10 and 22) via the user interface(s) 112.

Method 300 may continue with node 100*a* receiving a ring selection prompt result (block 308). For example, the operating system 112 of node 100*a* receives one or more ring selections in response to the selection prompt via the user interface(s) 112 from the user of node 100*a*. In the noted example, the operating system 112 of node 100*a* receives a selection of ring 10 from the user of node 100*a* via the user interface(s) 112.

Method 300 may continue with the RSM 134 of node 100*a* receiving the ring DS 142 associated with the selected ring (block 312). For example, ring DS reader 144 of node 100*a* reads the ring DS 142 associated with the selected ring.

Method 309 may continue with node 100*a* determining whether node 100*a* has hardware resource availably that is common with the denoted hardware listed in configuration entries in the received ring DS 142. For example, the received ring DS 142 may have configuration entries that are evoked by GPUs. Local configuration manager 140 via operating system 112 of node 100*a* knows that node may not include a GPU. Therefore, local configuration manager 140 may determine that it does not have the hardware availability in common with the denoted hardware listed in configuration entries in the received ring DS 142. Alternatively, local configuration manager 140 via operating system 112 of node 100*a* knows that node does include a GPU. Therefore, local configuration manager 140 may determine that it does have the hardware availability in common with the denoted hardware listed in configuration entries in the received ring DS 142.

If, there is not hardware availability in common with the denoted hardware listed in configuration entries in the received ring DS 142, method 300 may end. In other words, if there is no hardware resource availability within node 100*a* that would be needed to evoke equivalent configurations as listed by those configuration entries in the received ring DS 142, then node 100*a* may not be subscribed to the ring associated therewith.

Alternatively, if there is hardware availability in common with the denoted hardware listed in configuration entries in the received ring DS 142, method 300 may continue with the RSM 134 of node 100*a* subscribing to the ring associated with the received ring DS 142 (block 310).

The term "subscribe," "subscribing," or the like is defined herein to mean that the associated node has received ring DS 142 associated with the particular ring and has received both read and write permission to read from and write to that ring DS 142. In an implementation, the RSM 134 node 100*a* may receive read/write permission(s) to access the ring DS 142 by receiving read and/or write permission(s) from an node 100 that has previously subscribed to the ring (e.g., node 100*a* receives read/write permission from node 100*b*). Particularly, the RSM 134 of node 100*a* may request the ring DS 142 associated with ring 10 from node 100*b*. The RSM 134 of node 100*a* may, for example, query for and receive read/write permission from node 100*b* or may query for and receive read/write permission from another node 100 listed as a subscriber to ring 10 within its ring DS 142. In another implementation, read/write permission is openly given to the RSM 134 of applicable nodes. In such implementations, once the ring DS is received by requesting nodes 100, the ring DS writer 146 of such nodes 100 may write to the ring DS 142 to indicate that it has subscribed to the ring and therefore has read/write permission to access that ring's DS 142. Once the RSM 134 receives read/write permission to read/write to a subscription requested DS 142, RSM 134 may allow DS writer 146 functionality to the applicable ring (i.e., functionality of DS writer 146 to write to a particular DS 142 may be disallowed until the RSM 134 receives such read/write permission). Method 300 may continue with DS writer 146 writing an application configuration or sub-configuration entry associated with an installed and utilized application into the ring DS 142 (block 314).

Figure 6B:
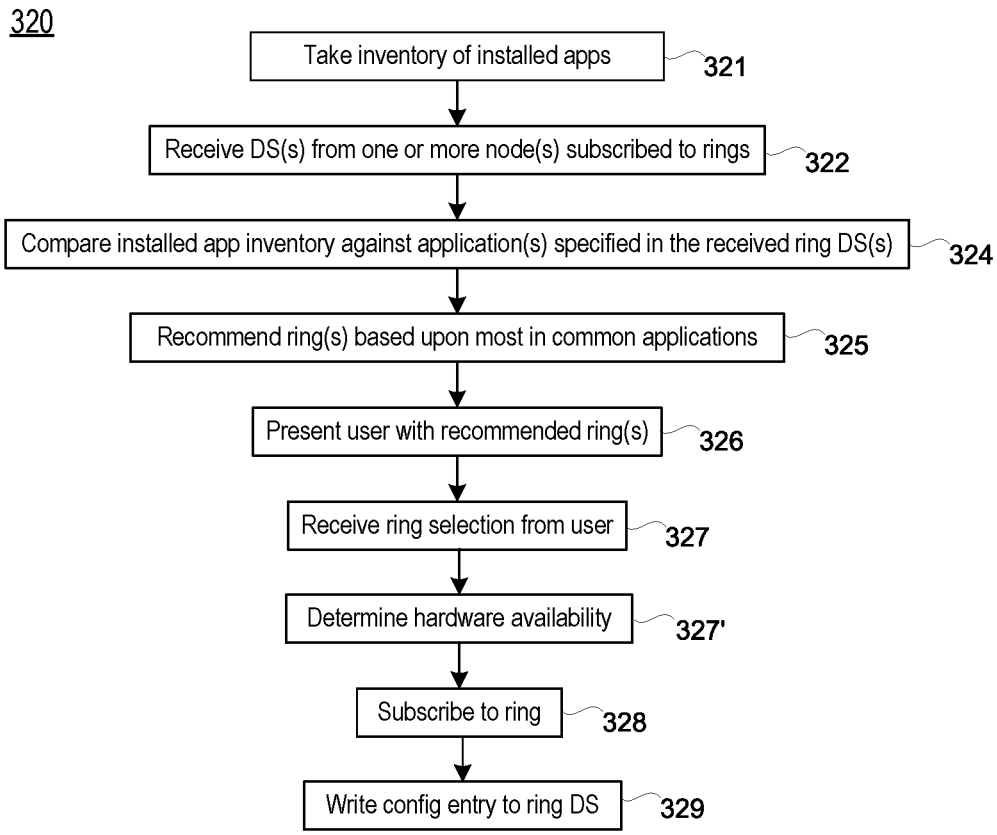
FIG. 6B is a block diagram illustrating a method of a computer system node subscribing to a software configuration management ring in accordance with one or more embodiments.

FIG. 6B is a block diagram illustrating a method 320 of a node 100 subscribing to a software configuration management ring, in accordance with one or more embodiments. Method 320 may be utilized by the node 100 PU(s) 102 evoking ring module 130 stored on memory 110 to cause the node 100 to carry out the described functions. Method 320 begins at block 321 by the application inventory manager 136 of node 100*a* taking an inventory or otherwise referencing a previously taken inventory of the installed software applications of node 100*a*. For example, application inventory manager 136 may query operating system 112, and receive therefrom, the currently installed applications (e.g., application 120, 122, and/or 124) stored in memory 110 of node 100*a*.

Method 320 may continue with requesting and receiving DS(s) 142 from one or more node(s) 100 that are associated with the rings that such node(s) 100 are subscribed (block 322). The RSM 134 node 100*a* may request and receive from peer nodes 100 connected to the same network 104 their ring DS(s) 142 associated with their subscribed rings. For example, the RSM 134 of node 100*a* may request and receive applicable ring DS(s) 142 from peer nodes connected to the same LAN. In another implementation, the RSM 134 of node 100*a* may request and receive applicable ring DS(s) 142 from a predetermined set or group of peer nodes. For example, the RSM 134 of node 100*a* may request and receive applicable ring DS(s) 142 from one or more previously trusted peer nodes 100 via network 104. For clarity, at block 324 the received ring DS(s) 142 are read only at the receiving node 100, since the RSM 134 of the receiving node has not yet subscribed to the associated rings.

Method 320 may continue with comparing the inventory of installed applications with the applications denoted within the received ring DS(s) 142 (block 324) and recommending one or more rings based upon the most in common applications (block 325). The RSM 134 of node 100*a* may compare these data sets to find the DS(s) 142 that include the highest number of applications listed in the DS(s) that are also installed upon memory 110 of node 100*a*. For example, RSM 134 of node 100*a* may determine that the ring DS 142 of ring 10 identifies the highest number of applications that have a recommendation score above a threshold (e.g. 75 or above) that are also installed and stored within memory 110 of node 100*a*. In some implementations, the RSM 134 may determine and recommend a static number of rings based upon these in common software applications, may recommend a variable number of rings based at least in part upon these in common software applications, or the like.

Method 320 may continue with presenting the recommended rings (block 326). For example, the operating system 112 of node 100*a* presents an identifier of the recommended rings upon the user interface(s) 112 to the user of node 100*a*. Node 100*a* may also query the user of node 100*a* to select one or more of the recommended rings associated with the query result. For example, the operating system 112 of node 100*a* prompts the user to select one or more of the recommended rings (e.g., ring 10) via the user interface(s) 112.

Method 320 may continue with node 100*a* receiving a ring selection prompt result (block 327). For example, the operating system 112 of node 100*a* receives one or more ring selections in response to the selection prompt via the user interface(s) 112 from the user of node 100*a*. In the noted example, the operating system 112 of node 100*a* receives a selection of ring 10 from the user of node 100*a* via the user interface(s) 112.

Method 320 may continue with node 100*a* determining whether node 100*a* has hardware resource availably that is common with the denoted hardware listed in configuration entries in the received ring DS 142 (block 327'). For example, the received ring DS 142 may have configuration entries that need 2 GB of memory 110 space. Local configuration manager 140 via operating system 112 of node 100*a* knows that node 100*a* has only 1 GB of memory 110 space. Therefore, local configuration manager 140 may determine that it does not have the hardware availability in common with the denoted hardware listed in configuration entries in the received ring DS 142. Alternatively, local configuration manager 140 via operating system 112 of node 100*a* knows that node 100*a* has 8 GB of memory 110 space. Therefore, local configuration manager 140 may determine that it does have the hardware availability in common with the denoted hardware listed in configuration entries in the received ring DS 142.

If, there is not hardware availability in common with the denoted hardware listed in configuration entries in the received ring DS 142, method 320 may end. In other words, if there is no hardware resource availability within node 100a that would be needed to evoke equivalent configurations as listed by those configuration entries in the received ring DS 142, then node 100a may not be subscribed to the ring associated therewith.

Alternatively, if there is hardware availability in common with the denoted hardware listed in configuration entries in the received ring DS 142, method 320 may continue with the RSM 134 of node 100a subscribing to the selected ring (block 328). The functions and associated description of block 334 may be similar to those of blocks 310, described above. Method 320 may continue with DS writer 146 writing an application configuration or sub-configuration entry associated with an installed and utilized application into the ring DS 142 (block 329).

Figures 7, 8:
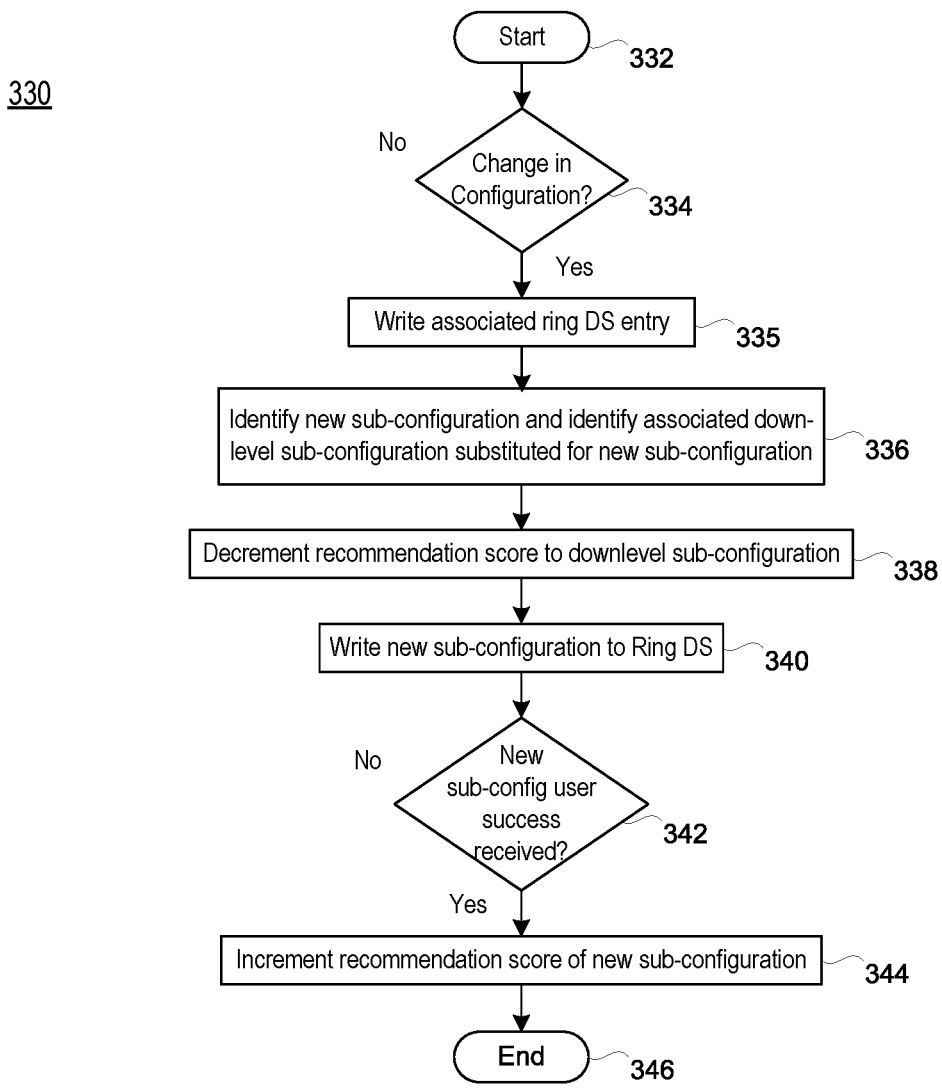
FIG. 7 is a block diagram illustrating an exemplary software configuration management ring data structure that is updated after a change to an sub-configuration in accordance with one or more embodiments.
FIG. 8 is a block diagram illustrating a method of writing to a software configuration management ring data structure as a result of a change to an sub-configuration associated therewith in accordance with one or more embodiments.

FIG. 7 is a block diagram illustrating an exemplary ring DS 230 that has been updated after a change to an sub-configuration, in accordance with one or more embodiments. Ring data structure 230 includes entries of software application sub-configurations (e.g., depicted as rows) written by ring DS writer 146 of applicable node 12. Each sub-configuration entry includes a ring identifier 202, a node identifier 204, a configuration identifier 206, and application identifier 208, an application installation time stamp 218, plug-in identifier 216, user setting listing 210, sub-configuration success/fail identifier 212, and a sub-configuration success/fail score 214.

In depicted exemplary ring data structure 230, configuration A has been changed by addition of newly installed sub-configuration of application 122, plug-in 210, user-setting M, N, Q installed at Feb. 16, 2021 at 10:30 am that replaced a down-level sub-configuration of application 122, plug-in 206, user-setting M, N, O installed at Jan. 3, 2021 at 8:32 am.

LCM 140 may identify the new sub-configuration installed local to the applicable node and the replaced down level sub-configuration. For example, the operating system 112, via user interface 112, prompts the user if a newly installed sub-configuration has replaced or superseded a prior sub-configuration. If the user confirms the new sub-configuration has replaced a prior sub-configuration, local configuration manager 140 via DS writer 146 may decrement the recommendation score associated with the prior down level sub-configuration within the associated DS.

Local configuration manager 140 may increment/decrement the recommendation score of a newly locally installed sub-configuration, upon receipt of an success/fail indication from the user, respectively. For example, the operating system 112 prompts the user if a newly installed sub-configuration to his/her node is, or has been, successful or is, or has been, a failure. If the user indicates the newly installed sub-configuration as successful or a failure, local configuration manager 140 via DS writer 146 may increment/decrement the associated recommendation score within the associated DS, respectively.

FIG. 8 is a block diagram illustrating method 330 of writing to a ring DS 142, as a result of a change to an sub-configuration associated therewith, in accordance with one or more embodiments. Method 320 may be utilized by the node 100 PU(s) 102 evoking ring module 130 stored on its local memory 110 to cause the node 100 to carry out the described functions. Method 330 begins at block 332 and continues with detecting a change in a sub-configuration (block 334). For example, local configuration manager 140 detects a newly installed or stored application within memory 110 (i.e., detects an addition of an application to a preexisting configuration), detects a newly installed plug-in within memory 110 (i.e. detects an addition of a plug-in to a preexisting application stored in memory 110), detects a modified or otherwise changed user-setting to a previously installed application, or the like. Similarly, local configuration manager 140 may detect a newly uninstalled application within memory 110 (i.e., detects a deletion of an application from a preexisting configuration), detects a newly uninstalled plug-in from memory 110 (i.e. detects an deletion of plug-in from a preexisting application stored in memory 110), or the like.

Upon the detection of the new/changed sub-configuration, local configuration manager 140 via DS writer 146 writes the new/changed sub-configuration entry within the associated DS 142 (block 335). For example, local configuration manager 140 via DS writer 146 writes the new/changed sub-configuration entry (application ID, plug-in ID, user-setting ID, or the like) within the associated DS 142.

Method 330 may continue with identifying the new/modified sub-configuration and identify an associated down level sub-configuration (if any) (block 336). For example, the operating system 112, via user interface 112, prompts the user whether a newly installed sub-configuration has replaced or superseded a prior sub-configuration. Upon receipt of an associated true user interaction with interface 112, local configuration manager 140 effectively determines whether a newly installed sub-configuration has replaced or superseded a prior sub-configuration. Upon receipt of an associated untrue user interaction with interface 112, local configuration manager 140 effectively determines a newly installed sub-configuration has not replaced or superseded a prior sub-configuration.

Method 300 may continue with decrementing an associated recommendation score within the sub-configuration entry of the associated ring DS 142 (block 338). For example, if the user confirms the new sub-configuration has replaced a prior sub-configuration, local configuration manager 140 via DS writer 146 may decrement the recommendation score associated with the prior down level sub-configuration within the associated DS 142.

Method 330 may continue with receiving an indication from the user as to whether a new sub-configuration is a success or failure (block 342). For example, the operating system 112 prompts the user if a new or changed sub-configuration to his/her node is, or has been, successful or is, or has been, a failure. If the user indicates the newly installed or changed sub-configuration has been indicated as a success, local configuration manager 140 via DS writer 146 increments the associated recommendation score within the associated DS (block 344). Method 330 may end at block 346.

Figure 9A:
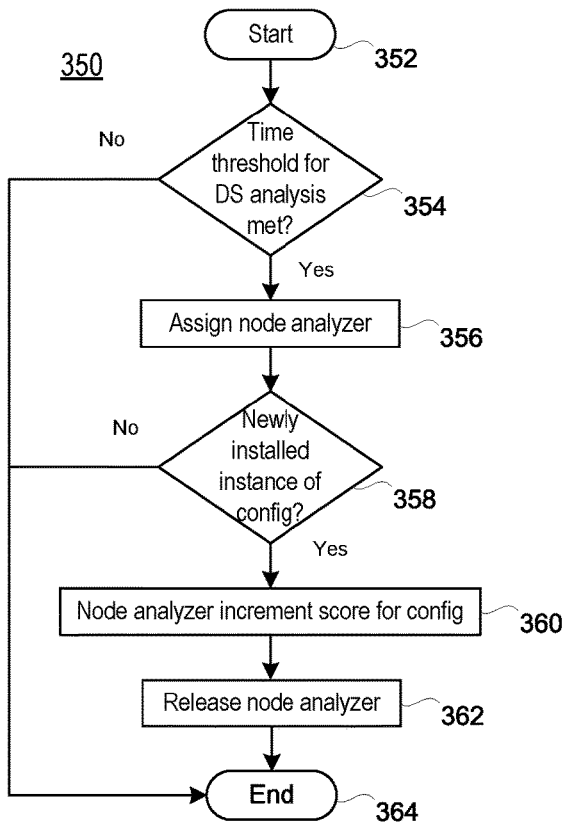
FIG. 9A and FIG. 9B are block diagrams illustrating a method of analyzing a software configuration management ring data structure in accordance with one or more embodiments.

FIG. 9A is a block diagram illustrating a method 350 of analyzing a ring DS 142, in accordance with one or more embodiments. Method 320 may be utilized by a node 100 PU(s) 102 evoking ring module 130 stored on its local memory 110 to cause the node 100 to carry out the described functions. Method 350 begins at block 352 and continues with determining whether a time threshold has elapsed since the last DS 142 analysis (block 354). For example, DS analyzer of a node 100 of a subscribed ring 142 determines that there has been a lapse of a predetermined threshold (e.g., one day, one week, or the like) since the DS 142 has last been analyzed.

Method 350 may continue with assigning a node analyzer if there has been the predetermined threshold since the DS 142 has last been analyzed (block 356). The process of assigning a node analyzer may include node 100*a* sending a write suspension request to the other nodes associated with the common ring DS 142. The write suspension request revokes ring DS writer 146 functionality to write to the ring DS 142 to the other nodes. As such, the ring DS writer 146 of the first node 110*a* is the only writer 146/node 100 of the subscribed ring to have write authority to the associated ring DS 142. Any pending writes to that ring DS 142 from the currently write suspended nodes 100 may be held in their respective local queue or memory 110 until the write suspension is lifted.

Method 350 may continue with determining whether there has been a newly installed instance of a configuration/sub-configuration (block 358). For example, the ring analyzer 148 of the analyzing node 100*a* may read the last time the node DS 142 was analyzed and read the installed entry 218 to determine if a new instance of an existing DS 142 entry of a configuration/sub-configuration has been installed or otherwise written to the ring DS 142. If there has been a newly installed configuration/sub-configuration instance of an existing installed entry within the ring DS 142, the ring DS writer 146 of the first node 110*a* increments the recommendation score(s) of the associated configuration/sub-configuration DS 142 entries (block 360). As such, generally, the more of the same current/installed configurations/configurations within nodes of the same DS 142, the higher the recommendation score of such configurations/sub-configuration entries of the DS 142.

Method 350 may continue with releasing the assigned node analyzer (block 362). The process of releasing the node analyzer may include assigned node analyzer node 100*a* sending a write resumption request to the other nodes associated with the common ring DS 142. The write resumption request re-allows ring DS writer 146 of the other nodes 100 to write to the ring DS 142. As such, the ring DS writers 146 of subscribed to ring all have write capabilities to the associated ring DS 142. Any pending writes to that ring DS 142 may be processed by the DS writer(s) 146 and the associated update(s) to the ring DS 142 may be read by each node 100 DS reader 144. As such, the ring DS 142 maintained as a single instance, or different instances of the same data structure, that is accessible to each subscribed node 100. Method 350 may end at block 364.

Figure 9B:
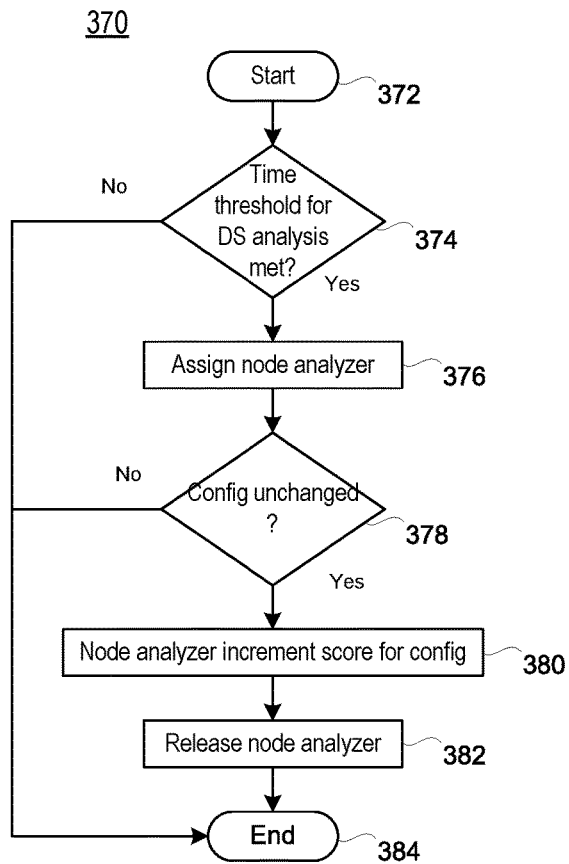

FIG. 9B is a block diagram illustrating a method 370 of analyzing a ring DS 142, in accordance with one or more embodiments. Method 370 may be utilized by a node 100 PU(s) 102 evoking ring module 130 stored on its local memory 110 to cause the node 100 to carry out the described functions. Method 370 begins at block 372 and continues with determining whether a time threshold has elapsed since the last DS 142 analysis (block 374). Method 350 may continue with assigning a node analyzer if there has been the predetermined threshold since the DS 142 has last been analyzed (block 374).

Method 370 may continue with determining whether an existing configuration/sub-configuration has been unchanged since the last analysis (block 378). For example, the ring analyzer 148 of analyzing node 100*a* may read the last time the node DS 142 was analyzed to determine whether a configuration or sub-configuration has been unchanged. For example, there has been no newly installed configuration/sub-configurations to replaced, there has been no new plug-ins to a sub-configuration, there has been no changes to user-settings, etc. If the configuration/sub-configuration has not changed, the ring DS writer 146 of the first node 110*a* increments the recommendation score(s) of the associated configuration/sub-configuration DS 142 entries (block 380). As such, generally, the longer a configuration/sub-configuration is utilized with no configuration/sub-configuration changes or updates, the higher the recommendation score of such configurations/sub-configuration entries of the DS 142. Method 370 may continue with releasing the assigned node analyzer (block 382) and may end at block 384.

Figure 10:
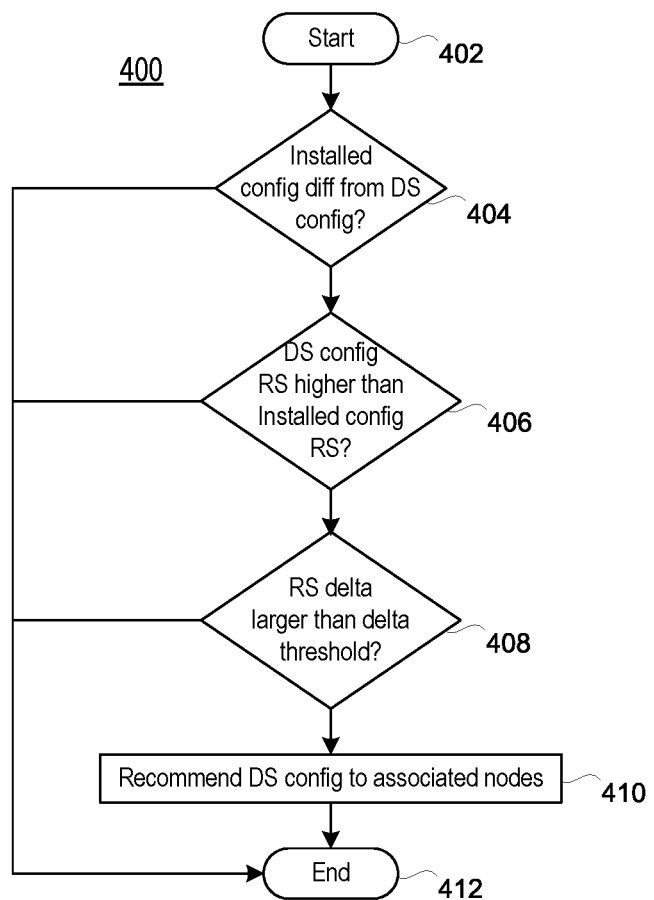
FIG. 10 is a block diagram illustrating a method of receiving a recommendation of a software configuration utilizing the software configuration management ring data structure in accordance with one or more embodiments.

FIG. 10 is a block diagram illustrating a method 400 of receiving a recommendation of a software configuration and/or sub-configuration utilizing a ring DS 142, in accordance with one or more embodiments. Method 400 may be utilized by a node 100 PU(s) 102 evoking ring module 130 stored on its local memory 110 to cause the node 100 to carry out the described functions. Method 400 begins at block 402 and continues with determining whether an installed configuration or sub-configuration is different from one or more configuration/sub-configuration entries upon an associated ring DS 142 (block 404). For example, the LCM 140 may prompt and receive a true/false acknowledgement from node 100 user whether a particular installed or utilized configuration or sub-configuration is the same as a configuration/sub-configuration DS 142 entry, serves the same intended purpose/function as a configuration/sub-configuration DS 142 entry, is the same application, or the like. Alternatively, the LCM 140 may compare the associated metrics of the configuration/sub-configuration against the metrics (e.g., configuration identifier, application identifier, plug-in identifier, user-setting listing, or the like) of a configuration/sub-configuration DS 142 entry to determine if an installed or utilized configuration or sub-configuration is the same as a configuration/sub-configuration DS 142 entry, serves the same intended purpose/function as a configuration/sub-configuration DS 142 entry, or the like. In a particular example, in reference to FIG. 4, the LCM 140 of node 12 may determine that its installed and utilized sub-configuration of Application 122 with user-settings of M, N, O is the same sub-configuration of Application 122 with user-settings of M, N, P utilized by nodes 14, 16.

If the installed or utilized configuration/sub-confirmation is a different configuration/sub-configuration from all DS 142 entries of the associated DS 142, serves a different purpose/function as all the DS 142 entries of the associated DS 142, are different applications, or the like, method 400 may end at block 10. If the installed or utilized configuration/sub-confirmation is the same configuration/sub-configuration as one or more DS 142 entries of the associated DS 142, serves the same purpose/function as one or more of the DS 142 entries of the associated DS 142, is the same application, or the like, method 400 may continue with determining whether the other configuration/sub-configuration entry or entries of the ring DS 142 have a higher recommendation score relative to the associated recommendation score of the installed or utilized configuration/sub-configuration (block 406). For example, the LCM 140 of node 12 may determine that the recommendation score of 60 of the installed and utilized sub-configuration of application 122 and user-settings of M, N, O is less than the recommendation score of 75 of the same sub-configuration: application 122 and user-settings of M, N, P utilized by nodes 14, 16.

If the installed or utilized configuration/sub-confirmation has a higher recommendation score relative to the recommendation scores of the other configuration/sub-configuration from all DS 142 entries of the associated DS 142, method 400 may end at block 10. However, if the installed or utilized configuration/sub-confirmation has a lower recommendation score relative to the recommendation scores of the other same configuration/sub-configuration, method 400 may continue with determining whether the recommendation score delta is larger than a predetermined delta threshold (block 408). For example, the LCM 140 of node 12 determines the recommendation score delta is (75−60=15) and compares the recommendation score delta against the predetermined delta threshold (e.g. 10). The user of node 100 may specify the predetermined delta threshold to establish a minimum floor for recommending other configurations/sub-configurations. For example, the user may specify that he/she only wants a recommendation for a configuration/sub-configuration if that configuration/sub-configuration has a recommendation score at least the delta threshold higher than the currently installed or utilized configuration/sub-configuration.

If the recommendation score delta is smaller than the predetermined delta threshold, method 400 may end at block 10. However, if the recommendation score delta is larger than the predetermined delta threshold, method 400 may continue with recommending one or more of the configurations/sub-configurations as indicated in the ring DS 142 (block 410). For example, the LCM 140 of node 12 recommends sub-configuration: application 122 and user-settings of M, N, P utilized by nodes 14, 16 to the user of node 12. The recommendation to the user may be accomplished by, for example, operating system 112 of the application node 100 presenting a prompt that identifies the recommended configuration/sub-configuration upon the user interface(s) 112 to the user of node 100. Method 400 may end at block 412.

Figure 11:
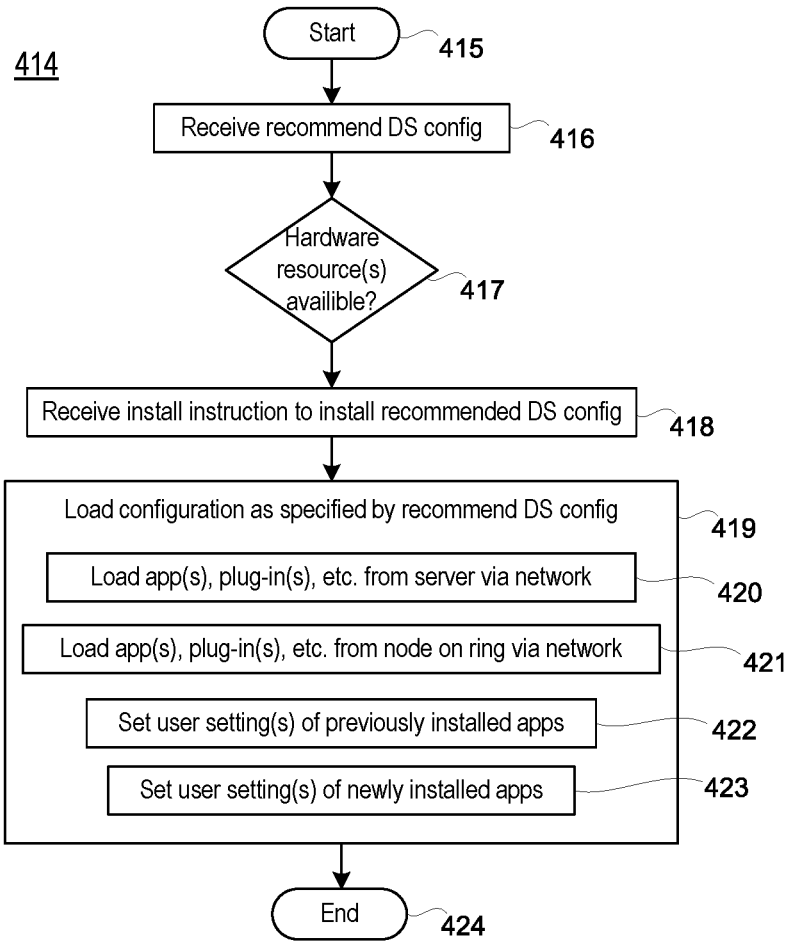
FIG. 11 is a block diagram illustrating a method of loading a recommended software configuration in accordance with one or more embodiments.

FIG. 11 is a block diagram illustrating a method 414 of loading a recommended software configuration and/or sub-configuration, in accordance with one or more embodiments. Method 414 may be utilized by a node 100 PU(s) 102 evoking ring module 130 stored on its local memory 110 to cause the node 100 to carry out the described functions. Method 414 begins at block 415 and continue with node 100 receiving a recommended ring DS 142 configuration/sub-configuration (block 416). For example, the node 100 receives from the LCM 140 of node 100 a configuration/sub-configuration by LCM 140 requesting that the operating system 112 of the node 100 presenting a prompt that identifies the recommended configuration/sub-configuration upon the user interface(s) 112 to the user of node 100.

Method 414 may continue with determining whether the node 100 has adequate hardware resources available to install and/or utilize the recommended configuration/sub-configuration (block 417). For example, operating system 112 of node 100 may determine current memory 110 utilization, or the like, against a predetermined memory space requirement of the recommended configuration/sub-configuration. If memory 110 has more memory space relative to the predetermined memory space requirement of the recommended configuration/sub-configuration, then may be determined that memory, there is adequate memory 100 recourses available. Similar techniques may be utilized to determine if there are adequate hardware resources (e.g., requisite PU 102 types, storage 106 space, etc.) of node 100 to install and/or utilize the recommended configuration/sub-configuration.

Method 414 may continue with receiving an installation instruction to install the recommended configuration/sub-configuration (block 418). For example, operating system 112 of the node 100 receives a installation selection of the recommended configuration/sub-configuration upon the user interface(s) 112 from the user of node 100.

Method 414 may continue with loading the recommended configuration/sub-configuration (block 419). For example, application loader 126 loads the recommended applications, application, plug-in, or the like from a centralized server accessible to each of the nodes 100 of a subscribed ring by network 104 (block 420). In another example, application loader 126 of node 100*a* loads the recommended applications, application, plug-in, or the like from a different node 100*b* that is subscribed the same ring (block 421). In another example, LSM 133 sets one or more user setting(s) within a previously installed application to be the same as or consistent with the recommended user settings associated with the recommended configuration/sub-configuration (block 422). Similarly, LSM 133 sets one or more user setting(s) within a newly installed application to be the same as or consistent with the recommended user settings associated with the recommended configuration/sub-configuration (block 423). Method 414 may end at block 424.

Figure 12:
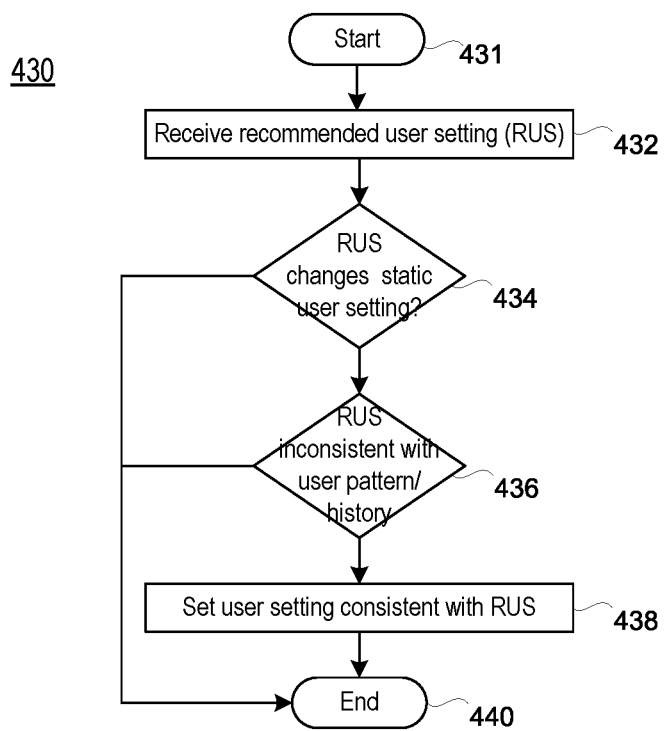
FIG. 12 is a block diagram illustrating a method of loading a recommended software user setting(s) in accordance with one or more embodiments.

FIG. 12 is a block diagram illustrating a method 430 of setting recommended software user setting(s) in accordance with one or more embodiments. Method 430 may be utilized by a node 100 PU(s) 102 evoking ring module 130 stored on its local memory 110 to cause the node 100 to carry out the described functions. Method 430 begins by node 100 receiving a recommended user-setting as specified by a ring DS 142 configuration/sub-configuration entry (block 432). For example, the node 100 receives from the LCM 140 of node 100 recommended user-settings of an application by LCM 140 requesting that the operating system 112 of the node 100 presenting a prompt that identifies the recommended user-settings upon the user interface(s) 112 to the user of node 100.

Method 430 may continue with determining whether the recommended user-setting(s) change a pre-set static user setting(s) (block 434). In an implementation, the user of node 100 may indicate to LSM 133 that one or more particular user-settings are static or otherwise not modifiable. For example, LSM 133 requests that the operating system 112 present a prompt upon user interface(s) 112 to the user to identify the user-settings of installed or utilized applications and may receive indications as to which of those user-settings are static. Once static user settings are established by LSM 133, the LSM 133 may then compare the recommended user-setting(s), as specified in a ring DS 142, against those user setting(s) that have been deemed static.

Method 430 may end at block 440 if the recommended user-setting(s) would change those user setting(s) that have been deemed static. Alternatively, if the recommended user-setting(s) do not change those user setting(s) that have been deemed static, method 430 may continue with determining whether the recommendation user-setting(s) would be inconsistent with a predetermined user pattern or against a predetermined user history (block 436). In an implementation, LSM 133 may detect one or more patterns or tendencies of the user's preferred user-settings(s) of the installed applications utilizing known techniques. Once user-setting patterns or tendencies have been established by LSM 133, the LSM 133 may then determine whether the recommended user-setting(s), as specified in ring DS 142, would be inconsistent with the predetermined user-setting patterns or tendencies.

Method 430 may end at block 440 if the recommended user-setting(s) would be inconsistent with the predetermined user-setting patterns or tendencies. Alternatively, if the recommended user-setting(s) are not inconsistent with the predetermined user-setting patterns or tendencies, the applicable user-setting(s) of previously installed or utilized application(s) are changed or set consistent with or otherwise specified by the recommended user-setting(s) (block 438). For example, with reference to FIG. 4, LCM 140 of node 100 of node 12 recommends user-settings of M, N, P for application 122 (the user-settings of M, N, O are currently being utilized by application 122 of node 12). LSM 133 determines that changing user-setting O to user-setting P does not affect a static user-setting (i.e., user setting O is not a predetermined static user-setting) and determines that changing user-setting O to user-setting P would not be inconsistent with predetermined user-setting patterns or tendencies. Resultantly, LSM 133 changes application 122 user-setting O to user-setting P.

Figure 13:
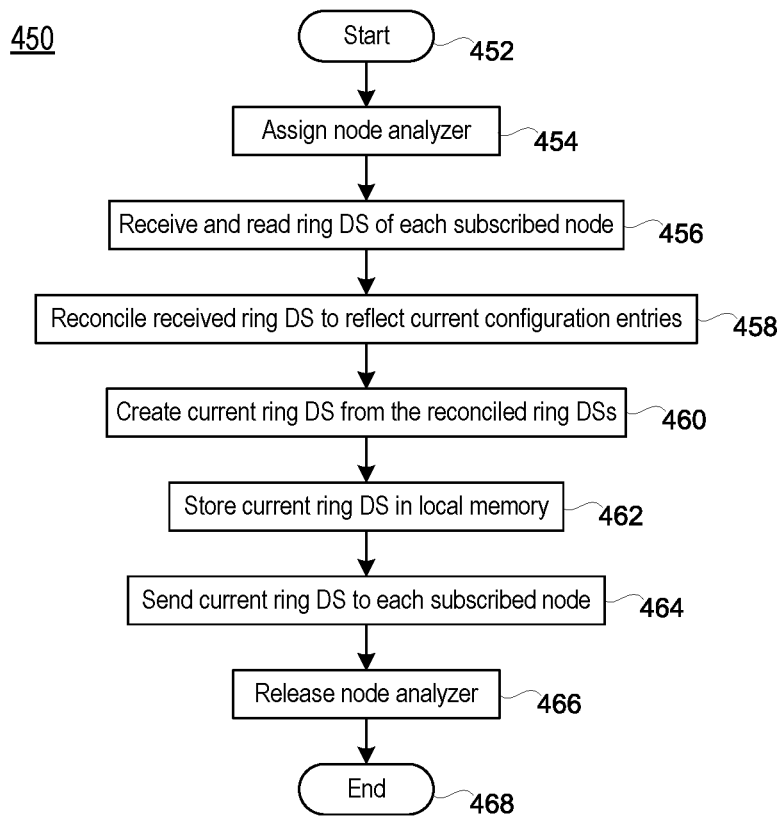
FIG. 13 is a block diagram illustrating a method of reading a software configuration management ring data structure from each subscribed node and creating a reconciled current ring DS therefrom in accordance with one or more embodiments.

FIG. 13 is a block diagram illustrating a method 450 of reading ring DS 142 from subscribed nodes and creating a reconciled current ring DS therefrom, in accordance with one or more embodiments. Method 450 may be utilized by a node 100 PU(s) 102 evoking ring module 130 stored on its local memory 110 to cause the node 100 to carry out the described functions. Method 450 begins at block 452 and continue with assigning a node analyzer (block 454). The process of assigning a node analyzer may include node 100a sending a write suspension request to the other nodes subscribed to the ring and therefore associated with the same ring DS 142. The write suspension request revokes ring DS writer 146 functionality to write to the ring DS 142 to the other nodes 100. As such, the ring DS writer 146 of the first node 110a is the only writer 146 of the subscribed ring to have write authority to the associated ring DS 142. Any pending writes to that ring DS 142 from the currently write suspended nodes 100 may be held in their respective local queue or memory 110 until the write suspension is lifted.

Method 450 may continue with the node analyzer requesting and receiving the ring DS 142 from each of the other nodes subscribed to the ring (block 456). For example, node 100a being assigned the node analyzer, ring DS reader 144 of node 100a requests and receives the copies of the ring DS 142 (or portions thereof) stored in each node's local memory 110. For example, node 100a requests and receives the full copy of each local ring DS 142 from the other subscribed nodes, node 100a requests and receives the distributed portion of the distributed ring DS 142 from the other subscribed nodes, node 100a requests and receives only the updated or changed portion(s) of the distributed ring DS 142 from the other subscribed nodes (e.g., the portions of the DS that have been updated or changed since the last reconciliation method 450), or the like.

Method 450 may continue with the node analyzer reconciling the received ring DSs 142 to reflect or otherwise identify the most current configuration entries (block 458). For example, ring DS analyzer 148 of the node analyzer compares each configuration entry across the received ring DSs 142. If all of the same respective configuration entries are the same, the ring DS analyzer 148 may indicate that such entry is current. If one or more of the same respective configuration entries are different, the ring DS analyzer 148 determines the most current entry, the most common entry, or the like, (i.e. analyzes modification time stamp or utilizes other known techniques to determine the most current, most current & common entry, or the like).

Method 450 may continue with the node analyzer creating a current ring DS 142 from the reconciled ring DSs (block 460). For example, ring DS analyzer 148 of the node analyzer assembles the most current configuration, most current & common configuration entry, or the like, into a single current ring DS 142 (most current ring DS 142).

Method 450 may continue with the node analyzer storing the most current ring DS 142 into its local memory 110 (block 462) and sending the most current ring DS 142 to the other nodes subscribed to the ring (block 464). For example, ring DS analyzer 148 of the node analyzer stores the most current ring DS 142 into memory 110 and sends the most current ring DS 142 to the other subscribed nodes 100 over the network 104. Method 450 may continue with releasing the node analyzer (block 466) and may end at block 468.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A peer to peer computer system comprising:
   a first computer and a second computer connected to the first computer by a network;
   the first computer comprising a first central processing unit (CPU) and a first memory communicatively connected to the first CPU, the first memory comprising first program instructions that when executed by the first CPU cause:
   the first computer to subscribe to a ring of a plurality of peer computer systems by storing a ring data structure within the first memory that is received from the second computer;
   in response to the first computer subscribing to the ring of the plurality of peer computer systems, the first computer to obtain read and write access to the ring data structure;
   the first computer to write a first application configuration entry to the ring data structure, wherein the ring structure is firstly updated, the first application configuration entry comprising a first node identifier that identifies the first computer, a first application identifier that identifies a first instance of an application stored in the first memory, one or more first user-specified settings of the first instance of the application, and a first recommendation score that indicates a first computer user-specified level of success of a combination of the first instance of the application and the first user-specified settings;
   the second computer comprising a second CPU and a second memory communicatively connected to the second CPU, the second memory comprising second program instructions that when executed by the second CPU cause:
   the second computer to obtain and read the updated ring data structure from the first computer; and
   the second computer to store a second instance of the application within the second memory and set second user-specified settings of the second instance of the application the same as the first user-specified settings in response to the recommendation score of the first application configuration entry exceeding a predetermined threshold.

2. The peer to peer computer system of claim 1, wherein the ring data structure received from the second computer comprises a prior application configuration entry comprising a second node identifier that identifies the second computer, a second application identifier that identifies a down level instance of the application stored in the second memory, one or more down level user specified settings of the down level instance of the application, and a second recommendation score that indicates a second computer user specified level of success of a combination of the down level instance of the application and the down level user-settings.

3. The peer to peer computer system of claim 2, wherein the predetermined threshold is the second recommendation score.

4. The peer to peer computer system of claim 3, wherein the second program instructions that when executed by the second CPU cause:

the second computer to write a second application configuration entry to the updated ring data structure, wherein the ring structure is secondly updated, the second application configuration entry comprising the second node identifier that identifies the second computer, a second application identifier that identifies the second instance of the application stored in the second memory, one or more second user specified settings of the second instance of the application, and a second recommendation score that indicates a second computer user specified level of success of the combination of the second instance of the application and the second user-specified settings.

5. The peer to peer computer system of claim 4, wherein the second program instructions that when executed by the second CPU cause:

the second computer to determine that an increased number of instances of the application is utilized by the plurality of peer computer systems; and the second computer to increment the first recommendation score of the first application configuration entry and the second recommendation score of the second application configuration entry, in response to the second computer determining that the increased number of instances of the application is utilized by the plurality of peer computer systems.

6. The peer to peer computer system of claim 5, wherein the second program instructions that when executed by the second CPU cause:

prior to the second computer incrementing the first recommendation score of the first application configuration entry and the second recommendation score of the second application configuration entry, the second computer to request that the plurality of peer computer systems pause writes to the ring data structure.

7. The peer to peer computer system of claim 6, wherein the second program instructions that when executed by the second CPU cause:

subsequent to the second computer incrementing the first recommendation score of the first application configuration entry and the second recommendation score of the second application configuration entry, the second computer to notify the plurality of peer computer systems to resume writes to the ring data structure.

8. A peer to peer computer system comprising:
a first computer connected to a plurality of computers by a network;
the first computer comprising a central processing unit (CPU) and a memory communicatively connected to the CPU, the memory comprising program instructions that when executed by the CPU cause:

the first computer to take an inventory of one or more applications stored in the first memory, wherein the one or more applications stored in the first memory are first computer applications;

the first computer to request and receive a read-only copy of a plurality of ring data structures associated with each subscribed ring from one or more of the plurality of computers;

the first computer to compare the first computer applications against one or more application identifiers within the received plurality of read-only copies of the ring data structures, wherein each of the one or more application identifiers identify an application stored in a respective local memory of the plurality of computers, wherein the application stored in the respective local memory comprises a ring identified applications;

the first computer to present a prompt upon a user-interface, the prompt comprising a recommended ring associated with a recommended read-only ring data structure that contains a highest number of mutually inclusive applications of the compared first computer applications and the ring identified applications;

the first computer to receive a user selection of the recommended ring via the user-interface; and the first computer to subscribe to the recommended ring, the subscribed ring comprising the first computer and a sub-set of the plurality of computers connected by the network, wherein in subscribing to the subscribed ring, the first computer and the sub-set of the plurality of computers are granted both read and write access to a subscribed ring data structure associated with the subscribed ring.

9. The peer to peer computer system of claim 8, wherein the first computer stores the subscribed ring data structure in the memory and wherein each of the sub-set of the plurality of computers stores the subscribed ring data structure in a local memory, respectively.

10. The peer to peer computer system of claim 8, wherein the first computer stores a portion of the subscribed ring data structure in the memory and wherein each of the sub-set of the plurality of computers stores a different portion of the subscribed ring data structure in a local memory, respectively.

11. The peer to peer computer system of claim 8, wherein the program instructions that when executed by the CPU cause:

the first computer to read an application configuration entry from subscribed ring data structure, the application configuration entry comprising a first node identifier that identifies a first node of the sub-set of the plurality of computers, a first application identifier that identifies a first instance of an application stored in a memory of the first node, one or more first node user specified settings of the first instance of the application, and a first recommendation score that indicates a first node user specified level of success of a combination of the instance of the application and the first node user specified settings.

12. The peer to peer computer system of claim 8, wherein the program instructions that when executed by the CPU cause:

the first computer to store a second instance of the application in the memory of the first computer; and
the first computer to set user-settings of the second instance of the application the same as the first node user specified settings.

13. The peer to peer computer system of claim 12, wherein the second instance of the application is received by the first computer from the first node.

14. The peer to peer computer system of claim 12, wherein the second instance of the application is received by the first computer from a server connected to the first computer by the network.

15. A peer to peer computer system method for managing software configurations, the method comprising:
- taking, with a first computer, an inventory of one or more applications stored in a first memory of the first computer, wherein the one or more applications stored in the first memory are first computer applications;
- receiving, with the first computer, a read-only copy of a plurality of ring data structures associated with each subscribed ring of a peer computer that is connected to the first computer by a network;
- comparing, with the first computer, first computer applications against one or more application identifiers within the read-only copies associated with the plurality of ring data structures, wherein each of the one or more application identifiers identify an application stored in a local memory of the peer computer, wherein the application stored in the respective local memory comprises a ring identified applications;
- presenting, with the first computer, a prompt upon a user-interface of the first computer, the prompt comprising a recommended ring associated with a recommended read-only ring data structure that contains a highest number of mutually inclusive applications of the compared first computer applications and the ring identified applications;
- receiving, with the first computer, a user selection of the recommended ring via the user-interface; and
- subscribing, with the first computer, to the recommended ring, the subscribed ring comprising the first computer and the peer computer, wherein in subscribing to the subscribed ring, the first computer and the peer computer are granted both read and write access to a subscribed ring data structure associated with the subscribed ring.

16. The peer to peer computer system method of claim 15, wherein the first computer stores the subscribed ring data structure in the first memory and wherein the peer computer stores the subscribed ring data structure in the local memory.

17. The peer to peer computer system method of claim 16, further comprising:
- reading, by the first computer, an application configuration entry from subscribed ring data structure, the application configuration entry comprising a first node identifier that identifies the peer computer, an application identifier that identifies a first instance of an application stored in the local memory of the peer computer, one or more peer computer user-specified settings of the first instance of the application, and a first recommendation score that indicates a peer computer user specified level of success of a combination of the instance of the application and the peer computer user specified settings.

18. The peer to peer computer system network method of claim 17, further comprising:
- storing, with the first computer, a second instance of the application in the memory of the first computer; and
- set, with the first computer, user-settings of the second instance of the application the same as the peer computer user specified settings.

19. The peer to peer computer system method of claim 18, wherein the second instance of the application is received by the first computer from the peer computer.

20. The peer to peer computer system method of claim 18, wherein the second instance of the application is received by the first computer from a server connected to the first computer by the network.

* * * * *